J. P. ERTEL.
FENDER FOR PLOWS.
APPLICATION FILED DEC. 17, 1909.
961,591.
Patented June 14, 1910.
2 SHEETS—SHEET 1.
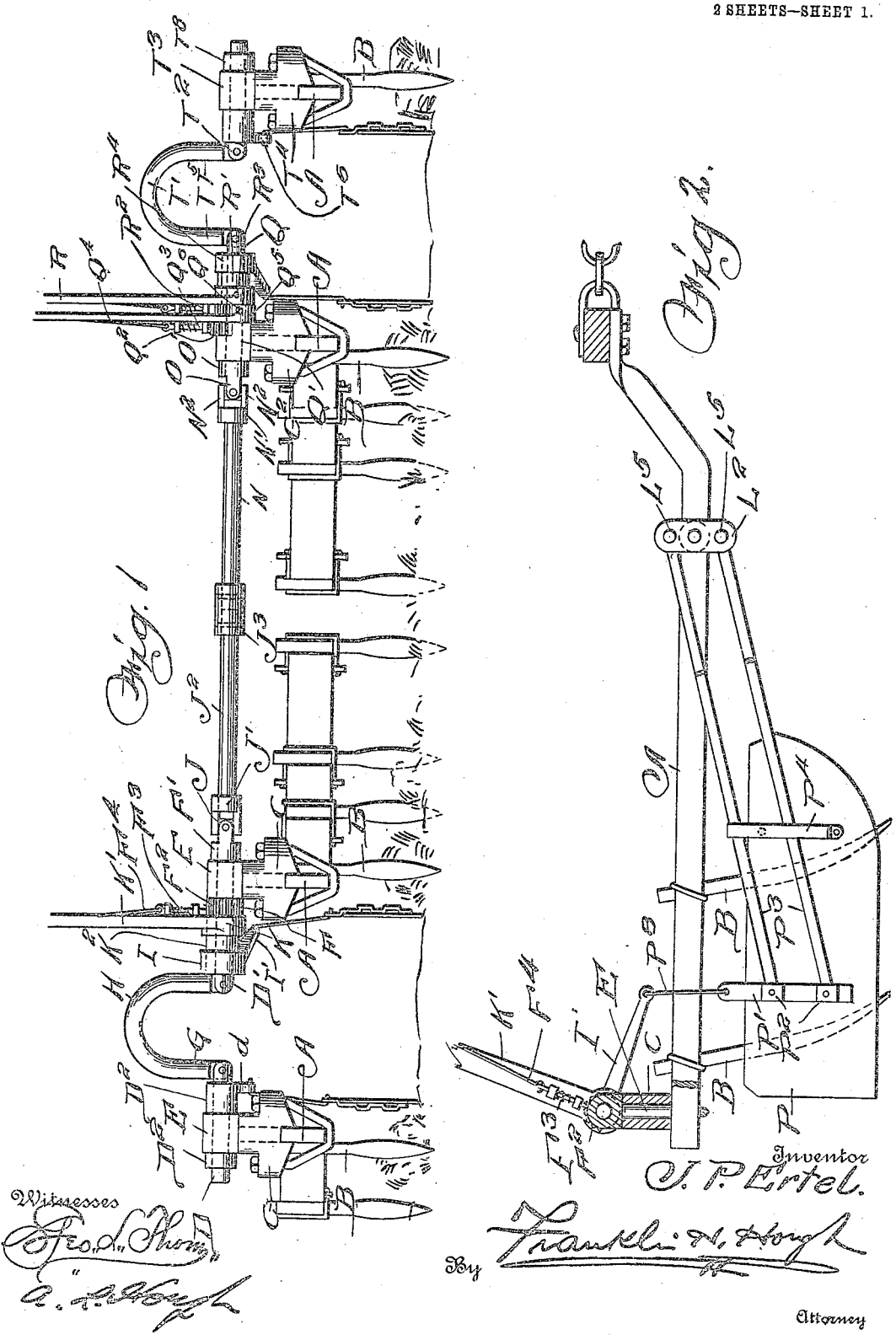

J. P. ERTEL.
FENDER FOR PLOWS.
APPLICATION FILED DEC. 17, 1909.
961,591.
Patented June 14, 1910.
2 SHEETS—SHEET 2.
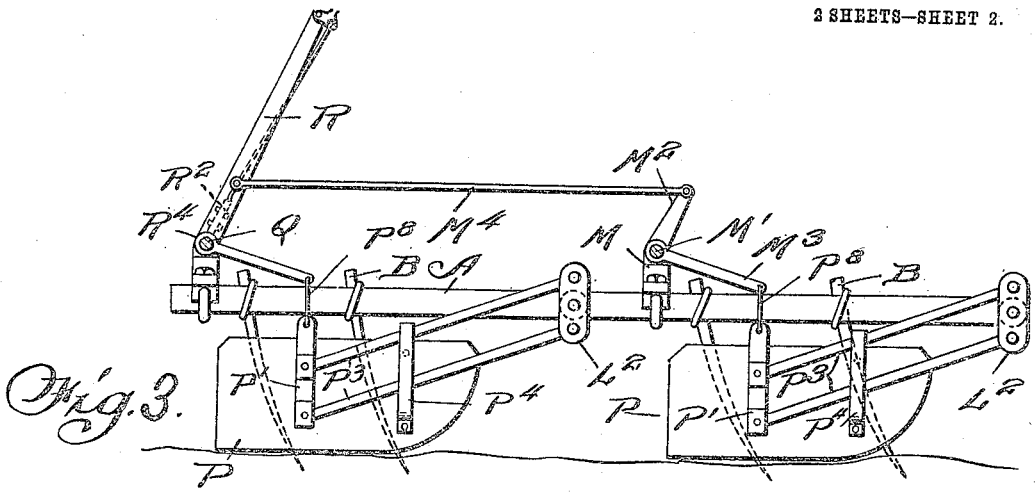
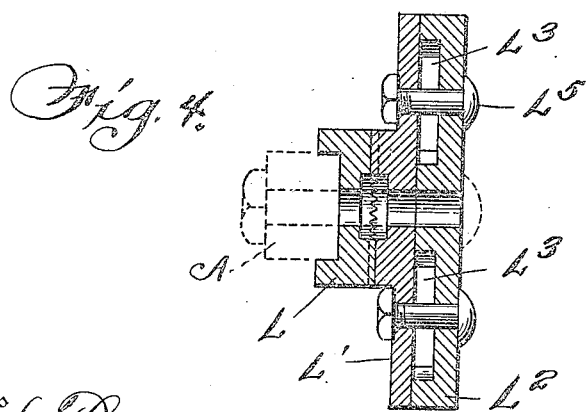

UNITED STATES PATENT OFFICE.

JOHN PERRY ERTEL, OF RUSHVILLE, INDIANA.

FENDER FOR PLOWS.

961,591.  Specification of Letters Patent. Patented June 14, 1910.

Application filed December 17, 1909. Serial No. 533,571.

*To all whom it may concern:*

Be it known that I, JOHN PERRY ERTEL, a citizen of the United States, residing at Rushville, in the county of Rush and State of Indiana, have invented certain new and useful Improvements in Fenders for Plows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fenders for plows and the object in view is to produce a simple and efficient device of this nature, comprising a flexible shaft carrying arms which are adapted to be connected to the rear portions of the fender and lever mechanism for raising singly one fender or a series of fenders, the apparatus being so arranged that one of the gang plows to which the device is adapted to be attached may be raised or lowered independent of the other set.

The invention consists further in the provision of fender mechanism for plows in which extension levers may be utilized on plows which have their gangs upon one side in advance of those upon the other and so arranged that all of the fenders will be raised an equal height as the lever mechanism is actuated.

The invention comprises various details of construction and combinations and arrangements of parts which will be hereinafter fully described and then specifically defined in the appended claims.

My invention is illustrated in the accompanying drawings, in which:—

Figure 1 is a rear elevation of my apparatus shown as applied to the frame of a gang plow. Fig. 2 is a side elevation of the fender and lever for raising and lowering the same. Fig. 3 is a side elevation showing extension means for actuating the fender when one set of plows is positioned in advance of the other, and Fig. 4 is a detail sectional view.

Reference now being had to the details of the drawings by letter, A, A designate the usual beams of a gang plow and B the plows arranged in series, one in advance of the other and one back of another in the usual way. Mounted upon said plow beams are the blocks C which are held to the beams in any suitable manner, each of said blocks preferably being recessed upon its under edge and adapted to fit over the upper edge of the frame. A sectional shaft is provided having sections D and D' which are journaled in the swiveled bearing members E, each of which has a shank portion E' engaging a socket in one of the blocks C. The section D is held in place within its bearing by means of the boxes D², one upon either side of the bearing E, while the shaft D' is held within its bearing block by means of the segment F and the sleeve F', each of which is fastened preferably by set screws to the shaft section D'. The adjacent ends of the shaft sections D and D' are slotted for the reception of the lower ends of the upright posts G of the arches H in which slots said posts are pivoted. Said arches are provided to allow the row of corn to pass therethrough without interference with the machine as it passes over the field being harrowed. Keyed to the shaft section D is a collar D² having an integral arm $d$, and K designates a collar having an integral lever K' fixed thereto and said collar K has a laterally extended sleeve K² upon which a collar I is keyed and said collar I has an integral arm I'. Said segment F is provided with teeth F² which are engaged by a pawl F³ connected to a rod F⁴ which is spring-pressed and mounted upon the lever K'.

Pivotally connected to the sleeve F' is a link J which in turn is pivoted to a link J', thus forming a swivel connection between the link J' and the sleeve F'. Said link J' is hollow and is keyed to a plug J² which engages a shell J³ which in turn is hollow at its opposite end for the reception of a plug N carried by the knuckle N'. Said knuckle has arms N² which are connected to the arms O of a knuckle O', the connection between the knuckle being a universal joint, and the shank portion of the knuckle O' is hollow for the reception of the inner end of the shaft Q which performs the same office as the shaft D'. A key is adapted to fasten the frame of the shaft Q to the knuckle O' whereby, as the shaft Q is rocked, a similar movement may be imparted to the shafts D and D'.

A swiveled bearing member Q' is mounted in the block C² which is similar in construction to the block C and has a series of segment teeth Q² formed upon its convexed edge, which teeth are adapted to be engaged by a pawl Q³ mounted upon the handle Q⁴ which is fixed to the collar Q⁵ which is held by means of a key Q⁶ to the shaft Q. A lever R is mounted upon a hollow cylindrical shell R' which is journaled upon the shaft Q and a pawl R² carried by the lever R is adapted to engage the teeth formed upon the collar Q⁵. A set screw R³ locks the lever R to the shell R', and R⁴ is a collar which is keyed to the shell R'. One end of the shaft Q is slotted as at Q⁴ and has pivotally connected thereto a post T of the arch T'. A sectional shaft T² is journaled in a bearing member T³ swiveled in the block T⁴ fastened upon the plow beam in the manner shown, and T⁵ designates a second post of the arch which is pivotally connected in the slotted end of the shaft section T². A lever T⁶ is fixed to the shaft T² by means of a set screw T⁷ and a collar T⁸ is fitted to the outer end of the shaft T² and serves to hold the shaft section T in its bearing.

A fender, designated in the drawings by letter P, is provided for each series of plows and each fender has fastened thereto a strip P' having loops P² formed therein, in each of which one end of a bar P³ is pivotally mounted. Said bars pass through the strap P⁴ which is formed of a piece of metal bent upon itself and spaced apart and the ends of said strap P⁴ are fastened to the fenders at any suitable location, as shown in the drawings.

Clamping plates, designated respectively by letters L, are held to each plow beam by bolts or other suitable means and intermediate the two plates L' and L² are the recesses L³, the opposite marginal edges of which recesses are cut away, and L⁵ designates pins which are passed through the walls of said recesses and upon which the corresponding ends of the bars P³ are pivoted. The upper end of the strips P has pivoted thereto a rod P⁸ which in turn is pivotally connected to the end of the lever R, forming means whereby, as the shaft to which the lever R is fastened is rocked, said lever will raise or lower the fender and in the raising and lowering movement said fender will be held in a horizontal position.

By the provision of the two bars P³ mounted as shown and described, the fender will be held in horizontal position by the upper bar P³ engaging the end of the loop P⁴ as the rock shaft carrying the arm I' connected to the stop P' is raised and lowered, the arrangement shown allowing the forward part of the fender to tilt if desired in case of its coming in contact with an obstruction.

It will be noted that a fender as shown and described is connected to the arms I', one fender for each side of the row whereby the soil, as it is loosened by the plows, may be pushed up against the corn or other plants being harrowed and treated. In the event of the fender being utilized upon gang plows in which one set of plows is slightly in advance of the other, the extension mechanism shown in Fig. 4 is utilized and which consists of the bearing members M fastened to the opposite sides of a plow beam and in which a counter shaft M' is journaled. M² and M³ designate levers of different lengths which are fixed to said counter shaft, and a rod M⁴ connects the levers M² and R, while a rod M⁶ connects the lever M³ with the arm of the collar R⁴. By this mechanism, it will be noted that the two series of gang plows may be raised equal distances from the ground by the rocking of the shaft in one direction.

The operation of the apparatus will be readily understood and is as follows:— When the parts are assembled as shown in the drawings and in the event of it being desired to raise all of the fenders simultaneously, the operator by releasing the pawl upon the lever Q⁴ from the segment teeth upon the bearing block Q' may rock the sectional shaft, causing all the fenders to be raised. In the event of it being desired to raise either pair of fenders independent of the others, it may be done, for instance, by releasing the pawl carried by the lever K' from engagement with the teeth upon the segment block F. In the event of it being desired to raise the set of plows to which the extension mechanism is applied, the pawl carried by the shaft R is released from the teeth upon the collar of the shaft Q⁴. Owing to the flexible connections and the universal joints, it will be noted that one gang plow may be raised or lowered without interference with the other plows and either set of fenders or all together may be operated separately or in unison.

By the clamping members which are fastened to the plow beams, it will be noted that they may be held in different positions in order to allow the fenders to be adjusted to operate at different angles.

While I have shown my invention as applied to a particular form of plow frame, it will be understood that the apparatus is applicable to various forms of harrow plows, necessitating only detailed alterations in attachments to the particular form of plow in connection with which it is to be used.

What I claim to be new is:—

1. In combination with a plow beam, a rock shaft mounted in suitable bearings thereon, plates clamped to said plow beam, bars pivotally mounted between said plates, one above and the other below the plow beam, a fender, a strip secured toward the rear portion of the fender and provided with loops in which the rear ends of said bars are pivoted, connections between said strip and lever, and means engaging said bars and fastened to the fender and designed to hold the same in a horizontal position adjusted at different heights.

2. In combination with a plow beam, a rock shaft mounted in suitable bearings thereon, plates clamped to said plow beam, bars pivotally mounted between said plates, one above and the other below the plow beam, a fender, a strip secured toward the rear portion of the fender and provided with loops in which the rear ends of said bars are pivoted, connections between said strip and lever, a strip bent upon itself and forming a guide loop fastened to said fender, said bars passing through the guide loop.

3. In combination with a plow beam, a rock shaft mounted in suitable bearings thereon, plates clamped to said plow beam, the inner face of one of said plates having a plurality of recesses, bolts passing through said recesses and plates, bars pivotally mounted upon said bolts one in each of said recesses, a fender, a strip fastened to the latter and having loops formed therein in which the rear ends of said bars are pivoted, suitable connections between said rock shaft and strip, a second strip bent to form loops and fastened to the forward portion of the fender and through which said bar is passed, and a pin passed through said second loop intermediate said bars.

In testimony whereof I hereunto affix my signature in the presence of two witnesses.

JOHN PERRY ERTEL.

Witnesses:
THOMAS M. GREEN,
LOIS M. REEVES.